United States Patent [19]

Nachbur et al.

[11] 3,864,076

[45] Feb. 4, 1975

[54] PROCESS FOR FLAMEPROOFING ORGANIC FIBERS WITH PHOSPHORUS-CONTAINING CONDENSATION PRODUCTS AND THE PRODUCTS PRODUCED

[75] Inventors: Hermann Nachbur, Dornach; Arthur Maeder, Therwil, both of Switzerland

[73] Assignee: Ciba-Geigy AG, Basel, Switzerland

[22] Filed: Aug. 31, 1972

[21] Appl. No.: 285,173

[30] Foreign Application Priority Data
Sept. 10, 1971 Switzerland.................... 13307/71
Jan. 14, 1972 Switzerland........................ 516/72

[52] U.S. Cl................... 8/116 P, 8/115.7, 252/8.1, 117/136
[51] Int. Cl.............................................. D06m 1/00
[58] Field of Search.......... 8/115.7, 116 P; 252/8.1; 260/564; 117/136

[56] References Cited
UNITED STATES PATENTS

| | | | |
|---|---|---|---|
| 2,809,941 | 10/1957 | Reeves et al. | 8/116 P |
| 2,814,573 | 11/1957 | Reeves et al. | 8/116 P |
| 2,993,746 | 7/1961 | Miles et al. | 8/116 P |
| 3,619,113 | 11/1971 | Stockel et al. | 8/116 P |
| 3,645,936 | 2/1972 | Gardner | 8/116 P |
| 3,698,854 | 10/1972 | Donaldson et al. | 8/116 P |
| 3,765,837 | 10/1973 | Aycock et al. | 8/116 P |

*Primary Examiner*—Stephen J. Lechert, Jr.
*Attorney, Agent, or Firm*—Joseph G. Kolodny; Edward McC. Roberts; Prabodh I. Almaula

[57] ABSTRACT

The subject of the invention is a process for the manufacture of condensation products of hydroxymethylphosphonium compounds and guanidines, characterised in that (a) 1 mol of a tetrakis-(hydroxymethyl)-phosphonium compound is condensed with (b) 0.02 to 0.5 mol, preferably 0.1 to 0.3 mol, of guanidine, guanidine salt, guanylurea, guanylurea salt or methylolated guanidine or guanylurea at 40° to 120°C, optionally in the presence of formaldehyde or a formaldehyde-donating agent and optionally in the presence of an inert organic solvent, optionally subsequently further condensed at temperatures of 100° to 150°C and, if appropriate, free hydroxyl groups are at least partially etherified with at least one alkanol with 1 to 4 carbon atoms and if appropriate the salts of the condensation products are converted into the corresponding hydroxides.

The condensation products are used for flameproofing organic fibre material, especially textiles.

14 Claims, No Drawings

PROCESS FOR FLAMEPROOFING ORGANIC FIBERS WITH PHOSPHORUS-CONTAINING CONDENSATION PRODUCTS AND THE PRODUCTS PRODUCED

The subject of the invention is a process for the manufacture of condensation products of hydroxymethylphosphonium compounds and guanidines, characterised in that (a) 1 mol of a tetrakis-(hydroxymethyl)-phosphonium compound is condensed with (b) 0.02 to 0.5 mol, preferably 0.1 to 0.3 mol, of guanidine, guanidine salt, guanylurea, guanylurea salt or methylolated guanidine or guanylurea at 40° to 120°C, optionally in the presence of formaldehyde or a formaldehyde-donating agent and optionally in the presence of an inert organic solvent, optionally subsequently further condensed at temperatures of 100° to 150°C and, if appropriate, free hydroxyl groups are at least partially etherified with at least one alkanol with 1 to 4 carbon atoms and if appropriate the salts of the condensation products are converted into the corresponding hydroxides.

The condensation is preferably carried out at 70° to 110°C in an inert organic solvent or solvent mixture. For this, aromatic hydrocarbons are above all suitable, such as, for example, toluene, o-, m- or p-xylene or a mixture thereof, or xylene-toluene, xylene-benzene or xylene-decahydronaphthalene mixtures. Preferably, the further condensation which may follow is carried out at 125° to 140°C or especially about 135°C, that is to say the boiling point of the solvent or solvent mixture.

At the same time it is however also possible to carry out the condensation in the absence of an inert organic solvent, for example if condensation product already manufactured is used as the solvent or if condensation is carried out in the melt.

An appropriate procedure is to heat the tetrakis-(hydroxymethyl)-phosphonium compound, which as a rule is present as an aqueous solution, to the boil together with the component (b), optionally in a solvent, and to distil off the water.

Possible tetrakis-(hydroxymethyl)-phosphonium compounds are above all salts and the hydroxide.

Suitable tetrakis-(hydroxymethyl)-phosphonium salts are, for example, the formate, acetate, phosphate or sulphate and the halides, such as, for example, the bromide or especially the chloride. Tetrakis-(hydroxymethyl)-phosphonium chloride is hereafter referred to as THPC.

Where tetrakis-(hydroxymethyl)-phosphonium hydroxide (THPOH) is used as the starting product, it is appropriately prepared beforehand from a corresponding salt, for example THPC, by neutralisation, preferably at a pH value of 7 to 7.5, in aqueous solution with a base, for example sodium hydroxide, and subsequent dehydration.

The component (b) can be present as guanidine or a methylol compound of guanidine, as guanylurea or a methylol compound of guanylurea, as guanylurea salt, or especially as guanidine salt. Preferred salts are inorganic salts, such as halides, nitrate, carbonate, phosphate or sulphate or organic salts such as the acetate or formate. Salts of particular interest are guanylurea phosphate and above all guanidine hydrochloride.

The optionally conjointly used formaldehyde is present preferably as an aqueous solution. The outstanding formaldehyde donor is paraformaldehyde.

The etherification, which may have to be carried out, of the condensation product which still contains free hydroxyl groups is effected, for example, with n-butanol, n-propanol, ethanol or especially methanol. Preferably, the reaction is carried out in an acid medium.

The acid catalysts optionally used conjointly in the condensation are preferably salts which have an acid action (LEWIS acids), such as magnesium chloride, iron-III chloride, zinc nitrate or boron trifluoride/-diethyl ether. The conjoint use of these catalysts is especially advisable in the condensation of THPOH.

After completion of the condensation and optional etherification, the salts of the condensation products can also be completely or partially converted into their corresponding hydroxides, which is as a rule effected by adding strong bases such as alkali metal hydroxides or alkaline earth metal hydroxides, for example sodium hydroxide, potassium hydroxide or calcium hydroxide, or also sodium carbonate. The amount of base is appropriately so chosen that the pH value of the reaction mixture is about 5 to 8. Appropriately, this conversion is carried out in the bath used for application.

At times, the end products show an unpleasant odour caused by volatile, low molecular trivalent phosphorus compounds, for example phosphines, such as trihydroxymethylphosphine. This odour can be eliminated by an oxidative after-treatment of the condensation product, for example by passing air or oxygen into the reaction mixture or by adding oxidising agents such as hydrogen peroxide or potassium persulphate.

The condensation products are used for flameproofing organic fibre material, especially textiles. For this, an appropriate procedure is to apply to these materials an aqueous preparation which contains at least (1) a condensation product of the indicated type and (2) a polyfunctional compound which differs from the condensation products according to (1), and to finish the materials treated in this way by the moist batch, wet batch, ammonia or, especially, thermofixing process.

The component (2) is preferably a polyfunctional epoxide or above all a polyfunctional nitrogen compound. Possible epoxides are above all epoxides which are liquid at room temperature and have at least two epoxide groups, which are preferably derived from polyhydric phenols. Polyfunctional nitrogen compounds are, for example, polyalkylenepolyamines or especially compounds which form aminoplasts, or aminoplast precondensates. The latter are preferred.

By compounds which form aminoplasts there are understood nitrogen compounds which can be methylolated and by aminoplast precondensates there are understood addition products of formaldehyde to nitrogen compounds which can be methylolated. As compounds which form aminoplasts or as nitrogen compounds which can be methylolated, there may be mentioned:

1,3,5-aminotriazines such as N-substituted melamines, for example N-butylmelamine, N-trihalogenomethylmelamines, triazones and ammeline, guanamines, for example benzoguanamines and acetoguanamines, or also diguanamines.

Further possibilities are: cyanamide, acrylamide, alkylurea or arylurea and alkylthioureas or arylthioureas, alkyleneureas or alkylenediureas, for example, urea, thiourea, urones, ethyleneurea, propyleneurea, acetylenediurea or especially 4,5-dihydroxyimidazolidone-2 and derivatives thereof, for example 4,5-dihydroxyimidazolidone-2 substituted in the 4-position, at the hydroxyl group, by the radical —CH$_2$CH$_2$CO—NH—CH$_2$OH. The methylol compounds of a urea, of an ethyleneurea or, especially, of melamine are preferentially used. Valuable products are in general given by products which are as highly methylolated as possible but in particular also by products with low methylolation. Methylolmelamines which may or may not be etherified are particularly suitable, for example dimethylolmelamine or trimethylolmelamine or mixtures thereof. Suitable aminoplast precondensates are both predominantly monomolecular aminoplasts and also more highly precondensed aminoplasts.

The ethers of these aminoplast precondensates can also be used together with the reaction products. For example, the ethers of alkanols such as methanol, ethanol, n-propanol isopropanol, n-butanol or pentanols are advantageous. It is, however, desirable that these aminoplast precondensates should be water-soluble, such as, for example, pentamethylolmelamine-dimethyl-ether of above all trimethylolmelamine-dimethyl-ether.

The organic fibre materials which are to be provided with a flameproof finish are, for example, wood, paper, furs, hides or preferably textiles. In particular, fibre materials of polyamides, cellulose, cellulose-polyester or polyester are flameproofed, fabrics of wool or polyester or mixed fabrics of polyester and cellulose, wherein the ratio of the polyester constituent to the cellulose constituent is 1:4 to 2:1, being preferred. It is thus possible to use, for example, so-called 20/80, 26/74, 50/50 or 67/33 polyester and cellulose mixed fabrics.

The cellulose or cellulose constituent of the fibre material originates, for example, from linen, cotton, rayon or staple viscose. In addition to polyester-cellulose fibre mixtures, fibre mixtures of cellulose with natural or synthetic polyamides can also be used. Above all, wool fibre materials can be flameproofed well with the polycondensation products.

The aqueous preparations for flameproofing the organic fibre materials as a rule contain 200 to 800 g/l, preferably 200 to 600 g/l or especially 350 to 560 g/l, of the component (1) and 20 to 200 g/l, preferably 40 to 120 g/l, of the component (2). The preparations in most cases have an acid to neutral or weakly alkaline pH value.

The preparations for flameproofing can optionally contain yet further additives. To achieve a greater deposit of substance on fabrics it is advantageous, for example, to add 0.1 to 0.5 percent of a high molecular polyethylene glycol. Furthermore, the customary plasticisers can be added to the preparations, for example an aqueous polyethylene emulsion or silicone oil emulsion.

To improve the mechanical strengths of the fibres it is also possible to add to the preparations suitable copolymers, for example copolymers of N-methylolacrylamide or cationic copolymers. Advantageous compositions for this purpose are, for example, aqueous emulsions of copolymers of a) 0.25 to 10 percent of an alkaline earth metal salt of an , β-ethylenically unsaturated monocarboxylic acid, b) 0.25 to 30 percent of a N-methylolamide or N-methylolamide-ether of an , β-ethylenically unsaturated monocarboxylic or dicarboxylic acid and c) 99.5 to 60 percent of at least one other copolymerisable compound. These copolymers and their manufacture are known. The tear strength and abrasion resistance of the treated fibre material can be favourably influenced by the conjoint use of such a copolymer.

If a polymer of the indicated type is also added to the preparation, it is advantageously added in small amounts, for example 1 to 10 percent relative to the amount of the polycondensation product. The same is true of any plasticiser which may be added, where the appropriate amounts can again be 1 to 10 percent.

It is also possible to add curing catalysts, such as, for example, ammonium chloride, ammonium dihydrogen orthophosphate, phosphoric acid, magnesium chloride or zinc nitrate, but is in most cases not necessary.

The pH value of the preparations is as a rule 2 to 7.5, preferably 4 to 7, and is adjusted in the usual manner by adding acid or base.

It can also be advantageous to add buffer substances, for example NaHCO$_3$, disodium and trisodium phosphate or triethanolamine.

To improve the durability of the flameproof finishes and to achieve a soft handle it can be advantageous to add, to the aqueous preparations, halogenated paraffins in combination with a polyvinyl halide compound.

The preparations are now applied to the fibre materials, which can be done in a manner which is in itself known. Preferably, piece goods are used, and are impregnated on a padder which is fed with the preparation at room temperature.

In the preferred thermofixing process, the fibre material impregnated in this way must now be dried and subjected to a heat treatment. Drying is appropriately carried out at temperatures of up to 100°C. Thereafter the material is subjected to a heat treatment at temperatures above 100°C, for example 100° to 200°C, preferably 120° to 180°C, the duration of which can be the shorter the higher is the temperature. This duration of heating is, for example, 30 seconds to 10 minutes.

It is, however, also possible to use the so-called moist fixing process or wet fixing process or the ammonia fixing process.

If the moist fixing process is used, the fabric is first dried to a residual moisture of about 5 to 20 percent and is thereafter stored for 12 to 48 hours at about 40° to 60°C, rinsed, washed and dried. In the wet fixing process a similar procedure is followed, except that the completely wet fibre material is stored. In the ammonia fixing process, the treated fibre material is first gas-treated with ammonia whilst moist and is subsequently dried.

A rinse with an acid-binding agent, preferably with aqueous sodium carbonate solution, can be appropriate in the case of a strongly acid reaction medium.

In the examples which follow, the percentages and parts are percentages by weight and parts by weight, respectively. The relationship of parts by volume to parts by weight is as of ml to g.

EXAMPLE 1

244 parts of a 78 percent strength aqueous solution of tetrakis-hydroxymethyl-phosphonium chloride (1 mol) and 11.9 parts of guanidine hydrochloride (0.125 mol) are treated for 2 hours at about 110°C internal temperature in a stirred vessel of 500 parts by volume capacity, which is equipped with a thermometer and reflux condenser. After completion of the reaction, the mixture is cooled to room temperature and a yellowish, low-viscosity solution of the condensation product, which contains 77 percent of active substance, is obtained. The infrared spectrum of this product shows the following bands:

| | | | | |
|---|---|---|---|---|
| Broad | band at approx. | 3,200 | cm$^{-1}$ | strong |
| Sharp | do. | 2,920 | do. | weak |
| Broad shoulder | do. | 2,850 | do. | medium |
| Broad shoulder | do. | 2,630 | do. | medium |
| Broad shoulder | do. | 2,470 | do. | weak |
| Broad shoulder | do. | 2,350 | do. | weak |
| Sharp | do. | 2,070 | do. | weak-medium |
| Broad | do. | 1,630 | do. | strong |
| Broad | do. | 1,410 | do. | medium |
| Sharp | do. | 1,295 | do. | weak |
| Broad shoulder | do. | 1,255 | do. | weak |
| Broad shoulder | do. | 1,195 | do. | weak-medium |
| Sharp | do. | 1,040 | do. | medium-strong |
| Sharp shoulder | do. | 910 | do. | medium |
| Broad shoulder | do. | 880 | do. | weak-medium |

EXAMPLE 2

244 parts of a 78 percent strength aqueous solution of tetrakis-hydroxymethyl-phosphonium chloride (1 mol), 11.9 parts of guanidine hydrochloride (0.125 mol) and 200 parts of xylene isomer mixture are heated to the boil, with rapid stirring, in a stirred vessel of 500 parts by volume capacity, equipped with a water separator and thermometer. The azeotropic removal of the water from the aqueous THPC solution starts at a boiling point of 108°C. After removal of this water (53.5 parts) the boiling point of the xylene is 130°C. A further 22.5 parts of water are removed azeotropically by continuing the reaction at 130°C, and a highly viscous condensation product is obtained. The product is cooled to about 90°C and dissolved by adding 200 parts of water, and the xylene is largely siphoned off. The aqueous solution is completely evaporated in vacuo at about 70°C. 173 parts of a clear viscous condensation product are obtained, and this is diluted with water to 80 percent active substance content to facilitate handling. The infrared spectrum of this product shows the following bands:

| | | | | |
|---|---|---|---|---|
| Broad | band at approx. | 3,200 | cm$^{-1}$ | strong |
| Broad shoulder | do. | 2,900 | do. | weak |
| Broad shoulder | do. | 2,850 | do. | weak |
| Broad shoulder | do. | 2,630 | do. | weak-medium |
| Broad shoulder | do. | 2,470 | do. | weak |
| Broad shoulder | do. | 2,350 | do. | weak |
| Sharp | do. | 2,070 | do. | weak |
| Broad | do. | 1,600 | do. | strong |
| Broad shoulder | do. | 1,550 | do. | weak |
| Broad | do. | 1,410 | do. | weak |
| Broad | do. | 1,295 | do. | weak |
| Broad | do. | 1,155 | do. | weak |
| Broad | do. | 1,095 | do. | weak |
| Broad | do. | 1,040 | do. | weak-medium |
| Broad | do. | 900 | do. | weak-medium |

EXAMPLE 3

244 parts of a 78 percent strength aqueous solution of THPC (1 mol of THPC) and 40 parts of guanylurea phosphate (0.2 mol) are treated for 2 hours at 100°C internal temperature in a stirred vessel of 500 parts by volume capacity, which is equipped with a thermometer and reflux condenser. Thereafter the mixture is cooled to room temperature and 283 parts of a clear, yellowish solution having an active content of 79 percent are obtained. The infrared spectrum of this product shows the following bands:

| | | | | |
|---|---|---|---|---|
| Broad | band at approx. | 3,240 | cm$^{-1}$ | strong |
| Broad shoulder | do. | 2,920 | do. | weak |
| Broad shoulder | do. | 2,240 | do. | weak |
| Broad shoulder | do. | 2,630 | do. | weak |
| Broad shoulder | do. | 2,470 | do. | weak |
| Broad shoulder | do. | 2,350 | do. | weak-medium |
| Sharp shoulder | do. | 2,070 | do. | weak-medium |
| Broad shoulder | do. | 1,680 | do. | strong |
| Broad | do. | 1,620 | do. | weak |
| Broad | do. | 1,550 | do. | weak |
| Broad | do. | 1,400 | do. | weak-medium |
| Broad shoulder | do. | 1,290 | do. | weak |
| Broad | do. | 1,205 | do. | weak |
| Sharp | do. | 1,040 | do. | weak-medium |
| Broad shoulder | do. | 980 | do. | weak |
| Broad shoulder | do. | 910 | do. | weak |
| Broad shoulder | do. | 880 | do. | weak |

EXAMPLE 4

190.5 parts (1 mol) of anhydrous crystalline THPC and 1.88 parts (0.01 mol) of 96 percent strength guanidine carbonate (corresponding to 0.02 mol of guanidine) are condensed in the melt at 100° – 106°C for 2 hours, in a stirred vessel of 500 parts by volume capacity, which is equipped with a thermometer and reflux condenser. Thereafter the mixture is cooled to 50°C, 80 parts of methanol and 0.1 part of 37 percent strength aqueous hydrochloric acid are added and etherification is carried out for 30 minutes at the reflux temperature (65° – 66°C). The mixture is then cooled to 60°C and the excess methanol is removed in vacuo. 183 parts of a crystalline product are obtained. The infrared spectrum of this product shows the following bands:

| | | | | |
|---|---|---|---|---|
| Broad | band at approx. | 3,240 | cm$^{-1}$ | strong |
| Sharp | do. | 2,910 | do. | weak |
| Broad shoulder | do. | 2,850 | do. | medium |
| Broad shoulder | do. | 2,640 | do. | weak-medium |
| Broad shoulder | do. | 2,470 | do. | weak |
| Broad shoulder | do. | 2,350 | do. | weak |
| Sharp | do. | 2,070 | do. | weak |
| Broad | do. | 1,640 | do. | medium |
| Broad | do. | 1,540 | do. | weak |
| Broad | do. | 1,410 | do. | medium |
| Broad | do. | 1,295 | do. | weak |
| Broad | do. | 1,190 | do. | weak |
| Broad shoulder | do. | 1,105 | do. | weak |
| Sharp | do. | 1,040 | do. | medium-strong |
| Sharp shoulder | do. | 910 | do. | weak-medium |
| Broad shoulder | do. | 880 | do. | weak |

EXAMPLE 5

218 parts of an aqueous 78 percent strength THPC solution (0.894 mol), 90 parts of guanidineurea phosphate (0.223 mol) and 18.9 parts of an aqueous 35.4 percent strength formaldehyde solution (0.223 mol) are condensed for 2 hours at 105° – 110°C internal temperature in a stirred vessel of 500 parts by volume capacity which is equipped with a thermometer and reflux condenser. After cooling, 311 parts of a clear aqueous solution, containing 8.9 percent of phosphorus, are obtained.

The infrared spectrum shows the following bands:

| | | | | |
|---|---|---|---|---|
| Broad shoulder | band at approx. | 3,240 | cm$^{-1}$ | strong |
| Broad shoulder | do. | 2,920 | do. | weak |
| Broad shoulder | do. | 2,850 | do. | medium-weak |
| Broad shoulder | do. | 2,650 | do. | weak-medium |
| Broad shoulder | do. | 2,360 | do. | weak |
| Broad shoulder | do. | 2,080 | do. | weak |
| Broad shoulder | do. | 1,670 | do. | medium |
| Broad | do. | 1,630 | do. | weak-medium |
| Broad | do. | 1,525 | do. | weak |
| Broad shoulder | do. | 1,460 | do. | weak |
| Broad shoulder | do. | 1,415 | do. | weak |
| Sharp shoulder | do. | 1,300 | do. | weak |
| Broad | do. | 1,230 | do. | weak-medium |
| Broad shoulder | do. | 1,160 | do. | weak |
| Sharp | do. | 1,045 | do. | weak-medium |
| Broad shoulder | do. | 985 | do. | weak-medium |
| Broad shoulder | do. | 925 | do. | weak |
| Broad shoulder | do. | 880 | do. | weak |

EXAMPLE 6

244 parts of a 78 percent strength aqueous solution of THPC (1 mol) are neutralised, in a stirred vessel of 500 parts by volume capacity, which is equipped with a thermometer and reflux condenser, to a pH value of 7.2 with 46.4 parts of 30 percent strength aqueous sodium hydroxide solution and 47 parts of guanidine carbonate (96 percent strength) (corresponding to 0.5 mol of guanidine) are subsequently added. Thereafter condensation is carried out for 2 hours at 100° – 110°C internal temperature. The mixture is then cooled to 60°C and evaporated to constant weight in vacuo.

198 parts of a viscous liquid condensation product containing 20.5 parts of NaCl are obtained.

The infrared spectrum shows the following bands:

| Broad | band at approx. | 3,240 | cm$^{-1}$ | strong |
|---|---|---|---|---|
| Broad | do. | 2,900 | do. | weak |
| Broad shoulder | do. | 2,850 | do. | medium-strong |
| Broad shoulder | do. | 2,640 | do. | weak |
| Broad shoulder | do. | 2,480 | do. | weak |
| Broad shoulder | do. | 2,340 | do. | weak |
| Broad | do. | 2,070 | do. | weak |
| Broad | do. | 1,600 | do. | strong |
| Broad | do. | 1,520 | do. | weak |
| Broad | do. | 1,405 | do. | weak |
| Broad | do. | 1,230 | do. | weak |
| Broad | do. | 1,155 | do. | weak |
| Sharp shoulder | do. | 1,100 | do. | weak |
| Broad | do. | 1,020 | do. | weak-medium |
| Sharp shoulder | do. | 920 | do. | weak |
| Broad shoulder | do. | 890 | do. | weak |

EXAMPLE 7

244 parts of a 78 percent strength aqueous THPC solution (1 mol), 23.9 parts of guanidine hydrochloride (0.25 mol) and 21.2 parts of aqueous 35.4 percent strength formaldehyde solution (0.25 mol) are condensed for 2 hours at 100° – 105°C in a stirred vessel of 500 parts by volume capacity which is equipped with a reflux condenser and thermometer. After cooling, 288 parts of a clear colourless solution of the condensation product are obtained. The P-content is 7 percent relative to the product itself.

The infrared spectrum shows the following bands:

| Broad | band at approx. | 3,240 | cm$^{-1}$ | strong |
|---|---|---|---|---|
| Sharp | do. | 2,920 | do. | weak |
| Broad shoulder | do. | 2,850 | do. | medium |
| Broad shoulder | do. | 2,620 | do. | medium |
| Broad shoulder | do. | 2,480 | do. | weak |
| Broad shoulder | do. | 2,350 | do. | weak |
| Sharp | do. | 2,070 | do. | medium-weak |
| Broad shoulder | do. | 1,660 | do. | strong |
| Broad shoulder | do. | 1,620 | do. | medium |
| Broad | do. | 1,410 | do. | weak |
| Sharp | do. | 1,295 | do. | weak |
| Broad | do. | 1,190 | do. | weak |
| Broad shoulder | do. | 1,100 | do. | weak |
| Broad | do. | 1,040 | do. | medium |
| Sharp shoulder | do. | 910 | do. | medium |
| Broad shoulder | do. | 880 | do. | weak |

EXAMPLE 8

244 parts of a 78 percent strength aqueous THPC solution (1 mol) and 106 parts (0.125 mol) of an aqueous 39.5 percent strength solution of the dimethylol compound of guanidine carbonate (manufactured from 1 mol of guanidine carbonate + 2 mols of $CH_2O$) are mixed at room temperature, in a stirred vessel of 500 parts by volume capacity which is equipped with a thermometer and reflux condenser, whereupon a strong evolution of $CO_2$ occurs. After this evolution of $CO_2$ has subsided, condensation is carried out for 2 hours at 100° – 105°C internal temperature.

After cooling, 345 parts of a clear, aqueous solution of the condensation product, containing 9 percent of phosphorus, are obtained.

The infrared spectrum of this product shows the following bands:

| Broad | band at approx. | 3,240 | cm$^{-1}$ | strong |
|---|---|---|---|---|
| Sharp | do. | 2,920 | do. | weak |
| Broad shoulder | do. | 2,850 | do. | medium |
| Broad shoulder | do. | 2,630 | do. | weak-medium |
| Broad shoulder | do. | 2,470 | do. | weak |
| Broad shoulder | do. | 2,350 | do. | weak |
| Sharp | do. | 2,070 | do. | weak-medium |
| Broad | do. | 1,630 | do. | strong |
| Broad | do. | 1,505 | do. | weak |
| Broad | do. | 1,410 | do. | weak |
| Sharp | do. | 1,290 | do. | weak |
| Sharp shoulder | do. | 1,235 | do. | weak-medium |
| Broad shoulder | do. | 1,190 | do. | weak |
| Sharp | do. | 1,105 | do. | weak |
| Broad | do. | 1,040 | do. | medium |
| Sharp shoulder | do. | 915 | do. | medium |
| Broad shoulder | do. | 880 | do. | weak-medium |

EXAMPLE 9

Mixed fabrics of polyester-cotton (PES/CO), 67/33, are padded with the liquors according to the following table, dried at 80° to 100°C and subsequently cured for 5 minutes at 150°C.

The fabric is then washed for 5 minutes at 60°C in a liquor which per litre contains 5 ml of hydrogen peroxide (35 percent strength), 3 g of sodium hydroxide solution (30 percent strength) and 1 g of a 25 percent strength aqueous solution of a condensation product of 1 mol of p-tert.-nonylphenol and 9 mols of ethylene oxide. Thereafter the fabric is rinsed and dried. The degree of fixing indicates the amount of the product present on the fibre material after rinsing (relative to the amount originally absorbed).

The fabrics are then washed up to 40 times for 45 minutes at 60°C in a domestic washing machine, using a liquor which contains 4 g/l of a domestic detergent (SNV 198,861 wash). The individual fabric samples are then tested for their flameproof character (DIN 53,906 vertical test; ignition time 6 seconds).

The results are summarised in the table which follows:

| Constituents | Untreated | Treated with Liquor A | Treated with Liquor B |
|---|---|---|---|
| Product according to Example 1 | | 505 | — |
| Product according to Example 2 | | | 485 |
| Dimethylolmelamine | | 96.5 | 96.5 |
| pH value of the liquor (adjusted with NaOH) | | 5.5 | 5.5 |
| Liquor uptake (%) | | 75 | 75 |
| Degree of fixing (%) | | 59 | 71 |
| Flameproof character | | Tear length (cm) | |
| After rinsing | burns | 11 | 10 |
| After 20 washes (60°C) | burns | 9 | 7.5 |
| After 40 washes (60°C) | burns | 10 | 9.5 |

EXAMPLE 10

One mixed fabric of each of 67:33 and 50:50 polyester-cotton (PES/CO) is padded with a liquor according to the table which follows, dried for 30 minutes at 80°C and subsequently cured for 5 minutes at 150°C.

The fabric is then washed for 5 minutes at 60°C in a liquor which per litre contains 5 ml of hydrogen peroxide (35 percent strength), 3 g of sodium hydroxide solution (30 percent strength) and 1 g of a 25 percent strength aqueous solution of a condensation product of 1 mol of tert.-nonylphenol and 9 mols of ethylene oxide. Thereafter the fabric is rinsed and dried. The degree of fixing indicates the amount of the product present on the fibre material after rinsing (relative to the amount originally taken up).

The fabrics are then washed up to 40 times for 45 minutes at 60°C in a domestic washing machine, using a liquor which contains 4 g/l of a domestic detergent (SNV 198,861 wash). The individual fabric samples are then tested for their flameproof character (DIN 53,906 vertical test; ignition time 6 seconds).

The results are summarised in the table which follows.

| Constituents | Untreated | g/l |
|---|---|---|
| Product according to Example 3 | | 625 |
| Dimethylolmelamine | | 96.5 |
| pH value of the liquor (adjusted with NaOH) | | 5.6 |

| | | Fabric 67:33 | PES:CO 50:50 |
|---|---|---|---|
| Liquor uptake (%) | | 75 | 75 |
| Degree of fixing (%) | | 66 | 48 |
| Flameproof character | | Smouldering time/tear length | |
| | | (sec.) | (cm) |
| After rinsing | burns | 0/13 | 0/9.5 |
| After 20 washes (60°C) | burns | 0/8.5 | 0/9 |
| After 40 washes (60°C) | burns | 0/9 | 0/8 |

EXAMPLE 11

Fabrics of polyester/cotton (PES/CO), 67:33, polyester (PES), cotton (CO) and wool gabardine (W) are padded with the liquors of the table below, and then finished as follows:

a. Dried at 80° to 100°C and subsequently cured for 5 minutes at 150°C (thermofixing process).

Rinse:

W + PES: wash for 5 minutes at 40°C in a bath which contains 4 g/l of sodium carbonate and 1 g/l of a 25 percent strength aqueous solution of a condensation product of 1 mole of p-tert.-nonylphenol and 9 mols of ethylene oxide, rinse and dry.

CO: like W + PES, but wash at the boil.

PES/CO: as indicated in Example 9.

b. Partly by the moist fixing or moist batch process:

After padding, batch at 10 percent residual moisture for 24 hours at 50°C, with the fibre material first being packaged airtight, then rinse with cold water and wash for 5 minutes in a bath which contains 4 g/l of sodium carbonate and 1 g/l of a condensation product of 1 mol of p-tert.-nonylphenol and 9 mols of ethylene oxide, at 60°C (CO at the boil), then rinse and dry.

c. Partly by the ammonia fixing process:

After padding, the fabric is dried incompletely at 80°C, then gassed with ammonia for 10 minutes and then treated for 10 minutes in a bath which contains 100 g/l of 24 percent strength aqueous ammonia, using a liquor ratio of 1:30. Thereafter the fabric is washed at 40°C in a bath which contains 5 g/l of soap and 6 ml/l of hydrogen peroxide (35 percent strength), rinsed and dried.

The fabrics are then washed up to 20 times for 45 minutes and at temperatures of 40°C (W + PES), 60°C (PES/CO) or 95°C (CO) in a domestic washing machine, using a liquor which contains 4 g/l of a domestic detergent (SNV 198,861 wash).

The individual fabrics are then tested for their flameproof character (DIN 53,906 vertical test; ignition time 6 seconds). Untreated fabrics burn away.

For pure polyester fabric, the test of the flameproof character is carried out in accordance with AATCC Test Method 34–1969. The degree of fixing indicates the amount of the flameproofing agent after rinsing, as a percentage of the amount originally taken up.

The results are summarised in the table which follows.

| | Thermofixing process (a) | | | | | | | | | | | | |
|---|---|---|---|---|---|---|---|---|---|---|---|---|---|
| | Treated with— | | | | | | | | | | | | |
| | PES/CO 50/50 | | | PES/CO 57/33 | | | | | | CO | | PES | W |
| | I | II | III | I | II | IV | V | III | VI | VII | VIII | IX | X | XI |
| Constituents, g./l.: | | | | | | | | | | | | | | |
| Products according to Example: | | | | | | | | | | | | | | |
| 4 | 480 | | | 480 | | | | | | | | | | 395 |
| 5 | | | | | | | | | | 915 | 915 | | | |
| 6 | | 520 | | | 520 | | | | | | | | | |
| 7 | | | | | | 760 | 760 | | | | | 407 | 407 | |
| 8 | | | 905 | | | | | 905 | | | | | 900 | |
| 9 | | | | | | | | | | | | | | |
| Di-trimethylolmelamine | 103 | 103 | 103 | 103 | 103 | 103 | 103 | 103 | 103 | | | 120 | 120 | 84.5 |
| Trimethylolmelamine-dimethylether (75% strength) | | | | | | | | | | 153 | | | 179 | |
| Condensation product * | | | | | | | | | | | | | | 2 |
| Silicone oil emulsion (40% strength) | 35 | 35 | 35 | 35 | 35 | 35 | 35 | 35 | 35 | 35 | 35 | 35 | 35 | 35 |
| pH value of the bath | 4.5 | **7 | 5.5 | 4.5 | **7 | **7 | 5.5 | 5.5 | 5.5 | 5.5 | **7 | 5.5 | 5.5 | 4.5 |
| Degree of fixing, percent | 57 | 82 | 72 | 57 | 82 | 54 | 56 | 71 | 81 | 68 | 68 | 64 | 64 | 78 |

—Continued

| | Treated with— | | | | |
|---|---|---|---|---|---|
| | Process (c) | | | Process (b) | |
| | PES/CO 50:50 | PES/CO 67:33 | W | PES/CO 50:50 | PES/CO 67:33 |
| | XII | XIII | XIV | XV | XVI |
| Constituents, g./l.: | | | | | |
| | Flameproof character: burning time (sec.)/tear length (cm.) | | | | |
| After rinsing | 0/9   0/7 | 0/6   0/12 | 0/9  0/9  0/11  0/11 | 0/10  0/9.5  0/5 | 0/6  5/13  0/3 |
| After 1 wash | 0/10  0/6 | 0/8   0/11 | 0/9  0/9  0/10  0/10 | 0/10  0/10   0/6 | 0/7  8/14.5 0/2 |
| After 5 washes | 0/10.5 0/6.5 | 0/7.5 0/10.5 | 0/8  0/9  0/9.5  0/4.5 | 0/5   0/9.5  0/7 | 0/6  4/10   2/6 |
| After 20 washes | 0/11  0/4 | 0/6.5 0/10 | 0/9  0/10 0/9.5  0/12.5 | 0/4.5 0/9.5  0/6 | 0/7  6/12.5 3/5 |
| Products according to Example: | | | | | |
| 4 | 480 | 480 | 395 | | |
| 8 | | | | 905 | 905 |
| Di-trimethylolmelamine | 103 | 103 | 84.5 | 103 | 103 |
| Condensation product* | | | 2 | | |
| Silicone oil emulsion (40% strength) | 35 | 35 | 35 | 35 | 35 |
| pH value | 4.5 | 4.5 | 4.5 | 4.5 | 4.5 |
| | Flameproof character: burning time (sec.)/tear length (cm.) | | | | |
| After rinsing | 0/7.5 | 0/10 | 0/3 | 0/9 | 0/11 |
| After 1 wash | 0/7 | 0/8.5 | 0/2 | 0/7 | 0/10 |
| After 5 washes | 0/6 | 0/9.5 | 2/6 | 0/7 | 0/10 |
| After 20 washes | 0/5.5 | 0/9.5 | 3/5 | 0/7 | 0/10 |

*Condensation product of 1 mol of p-tert.nonylphenol and 9 mols of ethylene oxide.
**Product converted into hydroxyl compound.

EXAMPLE 12

Fabrics of polyester/cotton (PES/CO), 67:33 and 50:50, are padded with the following liquor:
905 g/l of product according to Example 8
103 g/l of di-trimethylolmelamine
35 g/l of silicone oil emulsion (40 percent strength)
pH 4.5
Liquor uptake 70 percent Thereafter the fabrics are batched wet for 24 hours at 50°C (wet batch process), then rinsed with cold water and washed for 5 minutes in a bath which contains 4 g/l of sodium carbonate and 1 g/l of a condensation product of 1 mol of p-tert.-nonylphenol and 9 mols of ethylene oxide, then rinsed and dried.

The fabrics are then treated for their flameproof character according to DIN 53,906 (ignition time 6 seconds). Untreated fabrics burn away.

| | PES/CO 50:50 | PES/CO 67:33 |
|---|---|---|
| Burning time (seconds) | 0 | 0 |
| Tear length (cm) | 10 | 11.5 |

What is claimed is:

1. A process for flameproofing organic fiber materials, comprising the steps of applying to the organic fiber material an aqueous preparation comprising (1) a water-soluble condensation product of a tetrakis-(hydroxymethyl)-phosphonium salt or tetrakis-(hydroxymethyl)-phosphonium hydroxide and a guanidine, which is obtained by condensing (a) the tetrakis-(hydroxymethyl)-phosphonium compound with (b) guanidine, a guanidine salt, guanylurea, a guanylurea salt, a methylolated guanidine or guanylurea, in a molar ratio of 1:0.02 to 1:0.5, at a temperature in the range of 40° to 120°C, and (2) an aminoplast precondensate which is different from the condensation product (1), and subsequently finishing the organic fiber material by a moist batch, wet batch, ammonia or thermofixing process.

2. The process of claim 1, wherein the condensation product (1) is obtained by condensing the tetrakis-(hydroxymethyl)-phosphonium compound and the guandine in the presence of formaldehyde.

3. The process of claim 1, wherein the condensation product (1) is obtained by further condensation at a temperature in the range of 100° to 150°C.

4. The process of claim 1, wherein the condensation product (1) is obtained by further treatment with an alkanol of 1 to 4 carbon atoms to at least partially etherify the free hydroxyl groups of the condensation product.

5. Process according to claim 1, characterised in that the manufacture of the component (1) the condensation is carried out in the presence of at least one inert aromatic hydrocarbon as the solvent.

6. Process according to claim 1, characterised in that the two starting materials are condensed with one another in a molar ratio of 1:0.1 to 1:0.3.

7. Process according to claim 1, characterised in that in the manufacture of the component (1) a tetrakis-(hydroxymethyl)-phosphonium halide is used.

8. Process according to claim 1, characterised in that in the manufacture of the component (1), guanidine, guanidine salt or methylolated guanidine is used as the component (b).

9. Process according to claim 1, characterised in that in the manufacture of the component 1) guanidine salt is used.

10. Process according to claim 1, characterised in that an optionally etherified methylolmelamine is used as the component (2).

11. Process according to claim 1, characterised in that fibre material of polyamides, cellulose, cellulose-polyester or polyester if flameproofed.

12. Process according to claim 1, characterised in that the fibre material is dried at temperatures of up to 100°C and is subjected to a heat treatment above 100°C.

13. The organic fibre materials provided with a flameproof finish by the process according to claim 1.

14. The process of claim 1, wherein the condensation product (1) is obtained by condensation in an inert organic solvent.

* * * * *